United States Patent
Lin

(10) Patent No.: US 11,168,016 B2
(45) Date of Patent: Nov. 9, 2021

(54) GLASS MATERIAL WITH LOW VISCOSITY AND LOW BUBBLE CONTENT ATTRIBUTABLE TO LOW WEIGHT PERCENTAGE OF SILICON DIOXIDE

(71) Applicant: TAIWAN GLASS INDUSTRY CORP., Taipei (TW)

(72) Inventor: Chia-Yu Lin, Taipei (TW)

(73) Assignee: TAIWAN GLASS INDUSTRY CORP., Taipei (TW)

( * ) Notice: Subject to any disclaimer, the term of this patent is extended or adjusted under 35 U.S.C. 154(b) by 79 days.

(21) Appl. No.: 16/572,744

(22) Filed: Sep. 17, 2019

(65) Prior Publication Data

US 2021/0078896 A1   Mar. 18, 2021

(51) Int. Cl.
   *C03C 13/00* (2006.01)
   *C03C 3/087* (2006.01)
   *C03C 3/112* (2006.01)

(52) U.S. Cl.
   CPC ............. *C03C 3/087* (2013.01); *C03C 3/112* (2013.01)

(58) Field of Classification Search
   CPC ... C03C 13/046; C03C 13/091; C03C 13/087; C03C 3/087; C03C 3/091
   See application file for complete search history.

(56) References Cited

U.S. PATENT DOCUMENTS

| 5,958,808 A * | 9/1999 | Mori ....................... C03C 3/091 501/38 |
| 6,309,990 B2 * | 10/2001 | Tamura .................... C03C 13/00 501/35 |
| 2019/0144329 A1 * | 5/2019 | Inaka ...................... C03C 13/00 428/220 |
| 2020/0087196 A1 * | 3/2020 | Inaka ...................... C03C 3/087 |

FOREIGN PATENT DOCUMENTS

| CN | 101012105 A * | 8/2007 | ............. C03C 3/093 |
| WO | WO-2017187471 A1 * | 11/2017 | ............. C03C 13/00 |
| WO | WO-2018216637 A1 * | 11/2018 | ............. C03C 13/00 |

* cited by examiner

*Primary Examiner* — Karl E Group
(74) *Attorney, Agent, or Firm* — CIPO IP Group

(57) ABSTRACT

A glass material with low viscosity and a low bubble content attributable to a low weight percentage of silicon dioxide includes boron trioxide ($B_2O_3$), magnesium oxide (MgO), aluminum oxide ($Al_2O_3$), and calcium oxide (CaO) in addition to silicon dioxide ($SiO_2$); wherein Silicon dioxide ($SiO_2$) constitutes 45%-51% by weight of the glass material, boron trioxide ($B_2O_3$) 25%-35%, magnesium oxide (MgO) 0.01%-2%, aluminum oxide ($Al_2O_3$) 10%-14.5%, and calcium oxide (CaO) 4%-10%. As the silicon dioxide ($SiO_2$) content is lower than in the prior art, the glass material has lower viscosity, and hence a lower bubble content, than in the prior art, and this allows products made of the glass material to have a higher yield than products made of the conventional glass.

24 Claims, No Drawings

GLASS MATERIAL WITH LOW VISCOSITY AND LOW BUBBLE CONTENT ATTRIBUTABLE TO LOW WEIGHT PERCENTAGE OF SILICON DIOXIDE

FIELD OF THE INVENTION

The present invention relates to a glass material and more particularly to a glass material whose silicon dioxide content is lower than in the prior art and whose boron trioxide content is higher than in the prior art such that the viscosity, dielectric constant, and dissipation factor of the glass material are lower than in the prior art.

BACKGROUND OF THE INVENTION

Due to its outstanding physical properties, glass fiber has been an indispensable material in modern industries. "Glass fiber yarn", for example, which is made of electronic-grade glass fiber, is an essential substrate material of printed circuit boards. As an inorganic fiber, glass fiber has a circular cross section with a diameter ranging from several am to 20 μm, and has a density ranging from 2.4 to 2.7 g/cm$^3$. Moreover, glass fiber can be categorized according to its composition and the percentages of its constituent materials. The aforesaid electronic-grade glass fiber, for instance, is nowadays typically made of "E-glass", whose major components are generally silicon dioxide ($SiO_2$, at 52%-62%), aluminum oxide ($Al_2O_3$, at 12%-16%), calcium oxide (CaO, at 16%-25%), magnesium oxide (MgO, at 0-5%), and boron trioxide ($B_2O_3$, at 0-10%), and whose dielectric constant (DK) and dissipation factor (DF) are about 6.8-7.1 and 0.006 respectively.

The dielectric constant and dissipation factor of the conventional glass, however, leave something to be desired as explained below. With the advancement of wired and wireless network technologies and the rising market demand for electronic devices (e.g., smartphones and tablet computers), electronic devices with different functions have been developed, and to increase the operating speed and frequency of an electronic device, the circuit board used therein must almost always be made of low-dielectric-constant and low-dissipation-factor materials to meet product requirements, in particular the electrical specifications. Many glass manufacturers, therefore, have begun improving the components or composition of glass, with a view to developing glass materials that are more suitable for use in printed circuit boards.

Generally speaking, the process of making glass fiber from a glass material begins by placing the glass material into a furnace, where the glass material is heated to the intended "viscosity temperature" and thereby melted into a mass of homogeneous molten glass. The molten glass is then passed through a bushing in order to be separated into individual glass fibers. The aforesaid "viscosity temperature" refers to the temperature at which the viscosity of the melted glass material reaches 10$^3$ poise. As viscosity is generally expressed as a logarithm, the viscosity temperature of glass in an ideal molten state is also referred to as the Log 3 temperature. Many a glass manufacturer has successfully developed new glass materials that comply with the electrical requirements of printed circuit boards (e.g., the NE-glass developed by Nitto Boseki Co., Ltd. of Japan and the L-glass developed by Advanced Glassfiber Yarns (AGY) LLC of the US), but the applicant of the present patent application has found that air bubbles tend to form in glass while the glass is transformed from the molten state to the solid state, and that the higher the glass viscosity, the more difficult it is for the bubbles to escape. Should a large amount of bubbles remain in the glass, the resulting glass fiber will have many hollow fiber structures, and a circuit board made of such glass fiber will be prone to short-circuiting and therefore not good for use.

BRIEF SUMMARY OF THE INVENTION

To solve the foregoing problem of the conventional glass materials used in circuit board production, namely the undesirably high bubble content resulting from high glass viscosity, the inventor of the present invention incorporated years of practical experience into an extensive research and repeated trials and experiments and finally succeeded in developing a glass material whose low weight percentage of silicon dioxide leads to low glass viscosity and consequently a low bubble content.

One objective of the present invention is to provide a glass material that has low viscosity and a low bubble content attributable to a low weight percentage of silicon dioxide. The glass material includes a component for forming the main constructure of the glass material, a fluxing component, a reinforcing component, and a modifier. The component for forming the main constructure of the glass material includes silicon dioxide, which makes up 45%-51% by weight of the glass material. The fluxing component is used to lower the viscosity of the glass material while the glass material is in the molten state, and includes boron trioxide and magnesium oxide, with boron trioxide making up 25%-35% by weight of the glass material and magnesium oxide making up 0.01%-2% by weight of the glass material. The reinforcing component serves to increase the structural strength of the glass material and includes aluminum oxide, which makes up 10%44.5% by weight of the glass material. The modifier is used to increase the water resistance of the glass material and includes calcium oxide, which makes up 4%-10% by weight of the glass material. Thus, by decreasing the silicon dioxide content and increasing the boron trioxide content as compared with those in the prior art, the glass material of the present invention is provided with low viscosity as well as a low dielectric constant and a low dissipation factor.

DETAILED DESCRIPTION OF THE INVENTION

The present invention provides a glass material whose low weight percentage of silicon dioxide imparts low glass viscosity and a low bubble content to the material, and which can be used to make glass fiber or other glass products. Silicon dioxide ($SiO_2$) is one of the skeletal oxides generally used to form glass, and the applicant has found that the viscosity, and hence viscosity temperature, of a glass material increase with the silicon dioxide ($SiO_2$) content of the material. For instance, the conventional NE-glass, which has a silicon dioxide ($SiO_2$) content of 50%-60%, has a viscosity temperature of about 1300-1340° C., and the conventional L-glass, which has a silicon dioxide ($SiO_2$) content of 52%-60%, has a viscosity temperature of about 1315-1396° C. As previously mentioned, a glass material with high viscosity tends to be left with a large amount of air bubbles after the material is melted and formed. Glass fiber made of the conventional NE- or L-glass, therefore, generally has a tow yield because of an exceedingly high bubble content. However, the applicant has also found that merely reducing the silicon dioxide ($SiO_2$) content of a glass material will result in an increase in the dielectric constant and dissipation factor of the material and thereby compromise the electrical properties of the end products (e.g., circuit boards).

In light of the above, the applicant on the one hand adopts the technical feature of reducing the silicon dioxide ($SiO_2$) content of a glass material as compared with that in the prior art, and on the other hand has studied, experimented with, and adjusted other essential components of the glass material to not only lower the glass viscosity, but also produce the desirable dielectric constant and dissipation factor. According to one embodiment of the present invention, the glass material includes a component for forming the main constructure of the glass material, a fluxing component, a reinforcing component, and a modifier. The component for forming the main constructure of the glass material includes silicon dioxide ($SiO_2$), which constitutes 45%-51% by weight of the glass material. According to the results of tests conducted by the applicant, the aforesaid weight percentage range of silicon dioxide ($SiO_2$) gives the glass material a viscosity temperature of about 1228-1241° C., which is lower than those of the conventional glass and therefore allows air bubbles to escape with greater ease, meaning the bubble content of the glass material is lower than in the prior art. It follows that glass fiber made of the glass material disclosed herein is less likely to have hollow structures associated with the high viscosity of the conventional glass.

The fluxing component serves to reduce the viscosity of the glass material when the glass material is melted, and at least includes boron trioxide ($B_2O_3$) and magnesium oxide (MgO). In this embodiment, boron trioxide ($B_2O_3$) has a higher weight percentage (25%-35% by weight of the glass material) than in the prior art because the low silicon dioxide ($SiO_2$) content in the present invention will result in a high dielectric constant and a high dissipation factor of the glass material if the weight percentage of boron trioxide ($B_2O_3$), which is known to lower the dielectric constant and dissipation factor of glass, is not increased accordingly. The aforesaid weight percentage range of boron trioxide ($B_2O_3$) allows the glass material to conform to the electrical requirements of circuit boards. Magnesium oxide (MgO) can lower the melting temperature of the glass material and thereby facilitate the melting of the glass material and the formation of glass fiber. An overly high magnesium oxide (MgO) content, however, works against the reduction of the dielectric constant and dissipation factor of the glass material and may lead to phase separation of the glass material. Hence, considering the above, the weight percentage of magnesium oxide (MgO) is set at 0.01%-2%, preferably 0.1%-2%.

The reinforcing component is intended to increase the structural strength of the glass material and at least includes aluminum oxide ($Al_2O_3$), which is another skeletal oxide generally used to form glass. When there is insufficient aluminum oxide ($Al_2O_3$), the glass material will have low water resistance and a high dielectric constant, but when the weight percentage of aluminum oxide ($Al_2O_3$) exceeds 18%, the filament drawing process used to turn the glass material into glass fiber will require a high temperature. In this embodiment, therefore, aluminum oxide ($Al_2O_3$) constitutes 10%-14.5%, preferably 12%-14%, by weight of the glass material. The modifier is used to increase the water resistance of the glass material and at least includes calcium oxide (CaO). Calcium oxide (CaO) is a glass network modifier capable of lowering the melting temperature of the glass material during a subsequent glass fiber forming process, but a high calcium oxide (CaO) content will raise the dielectric constant of the glass material. In this embodiment, the weight percentage of calcium oxide (CaO) is set at 4%40%, preferably 6%-10%, of the glass material.

The fluxing component in this embodiment further includes fluorine ($F_2$) or a fluoride (e.g., $CaF_2$ or $MgF_2$) to lower the viscosity temperature of the glass material. According to the results of tests conducted by the applicant, fluorine ($F_2$) does not produce a noticeable fluxing effect when constituting less than 0.5% by weight of the glass material, and aggravates glass fiber evaporation (which leads to phase separation of glass fiber) and the corrosion of refractory material when constituting more than 3% by weight of the glass material. In this embodiment, therefore, the weight percentage of fluorine ($F_2$) is set at 0.01%-2%, preferably 1%-1.5%, of the glass material. The glass material may also be added with at least one alkali metal oxide for use as a fluxing component, wherein the at least one alkali metal oxide may include sodium oxide ($Na_2O$, constituting 0.01%-1% by weight of the glass material), potassium oxide ($K_2O$, constituting 0.01%-2% by weight of the glass material), and/or lithium oxide ($Li_2O$, constituting 0.01%-1% by weight of the glass material). As an excessively high alkali metal oxide content will increase the dielectric loss tangent, and impair the water resistance, of the glass material, the total content of the alkali metal oxide(s) is ideally 0.1%-0.5% by weight of the glass material.

The glass material further includes at least one impurity such as ferric oxide ($Fe_2O_3$, constituting 0.01%-1% by weight of the glass material) and/or titanium dioxide ($TiO_2$, constituting 0.01%-2% by weight of the glass material). As an excessive amount of impurities work against the reduction of the dielectric constant and dissipation factor of the glass material, and an extremely low impurity content will require the use of costly raw material, a compromise between high product quality and low production cost can be achieved with the glass material containing preferably 0.15%-0.25% ferric oxide ($Fe_2O_3$) by weight and preferably 0.25%-0.35% titanium dioxide ($TiO_2$) by weight.

The glass material disclosed herein can be formed into glass fiber by heating the glass material and subjecting the resulting molten glass to a filament drawing operation. During the process, the low silicon dioxide ($SiO_2$) content (45%-51% by weight of the glass material of the present invention as opposed to 52%-60% by weight of the conventional glass) lowers the viscosity of the glass material effectively, making it easier for air bubbles in the molten glass to escape, which prevents the formation of hollow fiber. Moreover, the high boron trioxide ($B_2O_3$) content provides the glass material with a low dielectric constant and a low dissipation factor that allow the end products (e.g., circuit boards made of the glass material) to meet their electrical requirements. To demonstrate the technical superiority of the present invention to the prior art, the applicant conducted the following tests and obtained the test results shown in Table 1 below. Eight batches of materials A1-A8 were prepared, each weighing 150 g and having a different composition from another batch. Each batch was poured into a 200 ml ceramic crucible and then heated at 1450° C. for about 6 hours, or until completely melted. The melt was allowed to cool down to room temperature gradually such that a glass block was formed. The glass block was cut with a diamond-tipped cutter into glass plate samples each having a length and width of 20 mm and a thickness of 2-3 mm. The dielectric constant and dissipation factor of each glass plate sample were then measured with a radio frequency (RF) impedance analyzer. According to the test results in Table 1 below, the log 3 fiber-forming temperatures ("log 3 FT" or "T3") of the glass samples A1-A8 are generally lower than 1250° C. and far lower than that of the conventional glass. The T3 temperature is the temperature at which a melted glass composition has a viscosity of 1,000 poise. During a subsequent glass melting and forming process, therefore, air bubbles can escape from the glass material of the present invention more easily than in the prior art, allowing the resulting glass products to have a low bubble content, which contributes to a high product yield.

TABLE 1

| Composition (wt %) | A1 | A2 | A3 | A4 | A5 | A6 | A7 | A8 |
|---|---|---|---|---|---|---|---|---|
| $SiO_2$ | 47.5 | 49.3 | 48.4 | 48.5 | 49.9 | 48.4 | 48.3 | 47.5 |
| $B_2O_3$ | 28.18 | 26.24 | 26.92 | 26.73 | 25.18 | 27.37 | 27.63 | 28.59 |
| MgO | 0.228 | 0.147 | 0.137 | 0.180 | 0.170 | 0.160 | 0.222 | 0.609 |
| $Al_2O_3$ | 12.6 | 12.6 | 13.1 | 12.8 | 13.0 | 12.9 | 12.8 | 10.3 |
| CaO | 9.57 | 9.35 | 9.53 | 9.57 | 9.67 | 9.48 | 9.23 | 8.62 |
| $F_2$ | 0.020 | 0.019 | 0.041 | 0.045 | 0.036 | 0.021 | 0.022 | 0.004 |
| $Na_2O$ | 0.285 | 0.403 | — | — | — | 0.385 | — | 0.474 |
| $K_2O$ | — | 0.051 | 0.058 | — | 0.089 | 0.094 | — | 0.142 |
| $Fe_2O_3$ | 0.257 | 0.271 | 0.26 | 0.274 | 0.282 | 0.261 | 0.265 | 0.212 |
| $TiO_2$ | 0.478 | 0.543 | 0.535 | 0.527 | 0.534 | 0.508 | 0.495 | 0.425 |
| T3 (° C.) | 1232.99 | 1240.63 | 1229.08 | 1229.72 | 1230.3 | 1230.39 | 1234.06 | 1238.36 |
| Dielectric constant (at 10 M Hz) | 4.9 | 5.1 | 4.9 | 4.8 | 4.9 | 5.0 | 5.0 | 4.9 |
| Dielectric constant (at 100 M Hz) | 4.9 | 5.1 | 4.9 | 4.8 | 4.9 | 4.9 | 5.0 | 4.9 |
| Dielectric constant (at 1 G Hz) | 4.9 | 5.0 | 4.9 | 4.8 | 4.9 | 4.9 | 5.1 | 4.9 |
| Dissipation factor (at 10 M Hz) | <0.001 | 0.003 | <0.001 | <0.001 | <0.001 | <0.001 | <0.001 | 0.001 |
| Dissipation factor (at 100 M Hz) | 0.001 | 0.001 | 0.002 | 0.001 | 0.001 | 0.001 | 0.001 | 0.001 |
| Dissipation factor (at 1 G Hz) | <0.001 | 0.001 | <0.001 | <0.001 | 0.001 | <0.001 | 0.001 | 0.001 |

While the invention herein disclosed has been described by means of specific embodiments, numerous modifications and variations could be made thereto by those skilled in the art without departing from the scope of the invention set forth in the claims.

What is claimed is:

1. A glass material with low viscosity and a low bubble content attributable to a low weight percentage of silicon dioxide, comprising:
    a component for forming a main constructure of the glass material, wherein the component comprises silicon dioxide ($SiO_2$), and the silicon dioxide ($SiO_2$) makes up at least 45% and lower than 50% by weight of the glass material;
    a fluxing component comprising boron trioxide ($B_2O_3$) and magnesium oxide (MgO), wherein the boron trioxide ($B_2O_3$) makes up 25%-35% by weight of the glass material, the magnesium oxide (MgO) makes up 0.01%-2% by weight of the glass material, and the fluxing component is used to reduce viscosity of the glass material when the glass material is melted;
    a reinforcing component comprising aluminum oxide ($Al_2O_3$), wherein the aluminum oxide ($Al_2O_3$) makes up 10%-14.5% by weight of the glass material and is used to increase structural strength of the glass material; and
    a modifier comprising calcium oxide (CaO), wherein the calcium oxide (CAO) makes up 4%-10% by weight of the glass material and is used to increase water resistance of the glass material,
    wherein the fluxing agent further comprises fluorine ($F_2$) or a fluoride, wherein the fluorine ($F_2$) or the fluoride makes up 0.01%-2% by weight of the glass material.

2. The glass material of claim 1, wherein the fluorine ($F_2$) or the fluoride makes up 1%-1.5% by weight of the glass material.

3. The glass material of claim 1, further comprising at least one alkali metal oxide selected from the group consisting of:
    sodium oxide ($Na_2O$), making up 0.01%-1% by weight of the glass material;
    potassium oxide ($K_2O$), making up 0.01%-2% by weight of the glass material; and
    lithium oxide ($Li_2O$), making up 0.01%-1% by weight of the glass material.

4. The glass material of claim 3, wherein the at least one alkali metal oxide has a total content of 0.1%-0.5% by weight of the glass material.

5. The glass material of claim 1, further comprising at least one impurity selected from the group consisting of ferric oxide ($Fe_2O_3$), making up 0.01%-1% by weight of the glass material, and titanium dioxide ($TiO_2$), making up 0.01%-2% by weight of the glass material.

6. The glass material of claim 2, further comprising at least one impurity selected from the group consisting of ferric oxide ($Fe_2O_3$), making up 0.01%-1% by weight of the glass material, and titanium dioxide ($TiO_2$), making up 0.01%-2% by weight of the glass material.

7. The glass material of claim 3, further comprising at least one impurity selected from the group consisting of ferric oxide ($Fe_2O_3$), making up 0.01%-1% by weight of the glass material, and titanium dioxide ($TiO_2$), making up 0.01%-2% by weight of the glass material.

8. The glass material of claim 4, further comprising at least one impurity selected from the group consisting of ferric oxide ($Fe_2O_3$), making up 0.01%-1% by weight of the glass material, and titanium dioxide ($TiO_2$), making up 0.01%-2% by weight of the glass material.

9. The glass material of claim 5, wherein the ferric oxide ($Fe_2O_3$) makes up 0.15%-0.25% by weight of the glass material.

10. The glass material of claim 6, wherein the ferric oxide ($Fe_2O_3$) makes up 0.15%-0.25% by weight of the glass material.

11. The glass material of claim 7, wherein the ferric oxide ($Fe_2O_3$) makes up 0.15%-0.25% by weight of the glass material.

12. The glass material of claim 8, wherein the ferric oxide ($Fe_2O_3$) makes up 0.15%-0.25% by weight of the glass material.

13. The glass material of claim 5, wherein the titanium dioxide ($TiO_2$) makes up 0.25%-0.35% by weight of the glass material.

14. The glass material of claim 6, wherein the titanium dioxide ($TiO_2$) makes up 0.25%-0.35% by weight of the glass material.

15. The glass material of claim 7, wherein the titanium dioxide ($TiO_2$) makes up 0.25%-0.35% by weight of the glass material.

16. The glass material of claim 8, wherein the titanium dioxide ($TiO_2$) makes up 0.25%-0.35% by weight of the glass, material.

17. The glass material of claim 5, wherein the calcium oxide (CaO) makes up 6%-10% by weight of the glass material.

18. The glass material of claim 6, wherein the calcium oxide (CaO) makes up 6%-10% by weight of the glass material.

19. The glass material of claim 7, wherein the calcium oxide CaO) makes up 6%-10% by weight of the glass material.

20. The glass material of claim 8, wherein the calcium oxide (CaO) makes up 6%-10% by weight of the glass material.

21. The glass material al claim 5, wherein the aluminum oxide ($Al_2O_3$) makes up 12%-14% by weight of the glass material.

22. The glass material of claim 6, wherein the aluminum oxide ($Al_2O_3$) makes up 12%-14% by weight of the glass material.

23. The glass material of claim 7, wherein the aluminum oxide ($Al_2O_3$) makes up 12%-14% by weight of the glass material.

24. The glass material of claim 8, wherein the alumina oxide ($Al_2O_3$) makes up 12%-14% by weight of the glass material.

\* \* \* \* \*

UNITED STATES PATENT AND TRADEMARK OFFICE
CERTIFICATE OF CORRECTION

| | | |
|---|---|---|
| PATENT NO. | : 11,168,016 B2 | Page 1 of 1 |
| APPLICATION NO. | : 16/572744 | |
| DATED | : November 9, 2021 | |
| INVENTOR(S) | : Chia-Yu Lin | |

It is certified that error appears in the above-identified patent and that said Letters Patent is hereby corrected as shown below:

In the Specification

Column 1, Line 22: replace "am to 20 μm" with --μm to 20 μm--

Column 2, Line 35: replace "10%44.5%" with --10%-14.5%--

Column 4, Line 2: replace "4%40%" with --4%-10%--

In the Claims

Column 5, Line 65, i.e., Claim 1, Line 22: replace "(CAO)" with --(CaO)--

Column 7, Line 20, i.e., Claim 16, Line 3: replace "glass, material" with --glass material--

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*